United States Patent [19]

Clary

[11] 3,746,848

[45] July 17, 1973

[54] FFT PROCESS AND APPARATUS HAVING EQUAL DELAY AT EACH STAGE OR ITERATION

[75] Inventor: James Barney Clary, Greensboro, N.C.

[73] Assignee: Bell Telephone Laboratories, Incorporated, Murray Hill, N.J.

[22] Filed: Dec. 27, 1971

[21] Appl. No.: 212,573

[52] U.S. Cl. .................................................. 235/156

[51] Int. Cl. ................................................. G06f 7/38

[58] Field of Search ................... 235/156; 324/77 B, 324/77 G, 77 H

[56] References Cited

UNITED STATES PATENTS

| | | | |
|---|---|---|---|
| 3,588,460 | 6/1971 | Smith | 235/156 |
| 3,673,399 | 6/1972 | Harcke et al. | 235/156 |
| 3,686,490 | 8/1972 | Goldstone | 235/156 |

OTHER PUBLICATIONS

T. H. Glisson, "The Digital Computation of Discrete Spectra Using the FFT"IEEE Trans. Vol. AU-18, No. 3, Sept. 70, pp. 271-286.

G. D. Bergland, "Digital Real-Time Spectral Analysis," IEEE Trans. on Electronic Computers Vol. EC-16, No.2 Apr. 67, pp. 180-185.

H. L. Groginsky, "A Pipeline FFT" IEEE Trans. on Computers Vol. C-19, No. 11, Nov. 70, pp. 1,015-1,019.

*Primary Examiner*—Eugene G. Botz
*Assistant Examiner*—David H. Malzahn
*Attorney*—W. L. Keefauver et al.

[57] ABSTRACT

Methods and apparatus for performing a sequential or cascaded version of the fast Fourier transform are described. A uniform set of delays are introduced in the described methods and apparatus, thereby permitting substantially identical apparatus to be used for each iteration. Unique data formatting and channeling arrangements permit high circuit efficiency and minimized overall complexity.

8 Claims, 8 Drawing Figures

FFT PROCESS AND APPARATUS HAVING EQUAL DELAY AT EACH STAGE OR ITERATION

GOVERNMENT CONTRACT

The invention herein claimed was made in the course of or under a contract with the Department of the Navy.

BACKGROUND OF THE INVENTION

1. Field of the Invention

The present invention relates to machine data processing techniques for processing signals. More specifically, the present invention relates to data processing apparatus and methods for performing fast Fourier transformations on sets of data signals. Still more particularly, the present invention relates to fast Fourier transform apparatus and methods for performing fast Fourier transforms using a single processing stage or a number of processing stages.

2. Prior Art

The well-known fast Fourier transform (FFT) techniques have been applied to a wide range of signal analysis problems. Each of these techniques has in common, however, the fact that a sequence or array of input signals are processed to derive a corresponding sequence or array of output signals, which output signals are related to the input signals by the Fourier transform relation. The importance of the fast Fourier transform techniques as compared with the previously well-known discrete Fourier transform, DFT, techniques (described, for example, in Blackman and Tukey, The Measurement of Power Spectra, John Wiley & Sons, New York 1962), is that the fast Fourier transform techniques represent a substantial enhancement in speed of processing. A 2 order-of-magnitude enhancement is not uncommon as between the FFT and the (classical) DFT.

Particular apparatus and methods for performing the fast Fourier transform have taken many different forms. A summary describing several of the most popular configurations is contained in "Fast Fourier Transform Hardware Implementations" by G. D. Bergland IEEE Trans. Audio and Electroacoustics, Vol. AU-17, June 1969, pp. 104–108. A useful tutorial reference is Cochran et al. "What Is the Fast Fourier Transform." IEEE Trans. Audio and Electroacoustics, June 1967, pp. 45–55. Still another early article in the field describing many of the general aspects of the fast Fourier transform is Gentleman and Sande "Fast Fourier Transforms for Fun and Profit," Proc. AFIPS FJCC, Vol. 29, Spartan Books, Washington, D.C., 1966, pp. 563–578.

One particular form for fast Fourier transform apparatus is the so-called sequential processor described, for example, in R. Klahn et al., "The Time-Saver: FFT Hardware," Electronics pp. 92–97, June 24, 1968. Other references dealing with this general form of machine organization are R. R. Shively "A Digital Processor to Generate Spectra in Real Time," IEEE Trans. Computers, Vol. C–17, pp. 485–491, May 1968, and U.S. Pat. No. 3,517,173 issued June 23, 1970 to M. J. Gilmartin, Jr. et al. One organization for sequential fast Fourier transform processing which has found favor in some applications is that described in Singleton, "A Method for Computing the Fast Fourier Transform with Auxiliary Memory and Limited High-Speed Storage," IEEE Trans. on Audio and Electroacoustics, Vol. AU-15, No. 2, June 1967, pp. 91–98.

It is a characteristic of the organization described in the Singleton paper, supra, that computations are performed and results obtained for effectively independent subsets of data. That is, the transformation is not an in-place transformation and all results for a given iteration are generated before the next iteration is begun. Further, it has been found by the present invention that if a plurality of Singleton-type units are used for performing respective successive interations of the FFT, they are all substantially identical. That is to be compared with, for example, the non-identical cascade processors described in typical embodiment in U.S. Pat. No. 3,544,775 issued to Bergland et al, on Dec. 1, 1970. In the Bergland configuration each stage requires a different degree of delay, i.e., each stage has different memory requirements with possible attendant addressing difficulties for some embodiments.

An important advantage of the (single) sequential processor organization is that while it may suffer from a somewhat slower operating speed, its sequential nature permits an examination of intermediate results before proceeding further with the computation. Thus, such desirable features as conditional scaling of results may be performed to insure improved accuracy. This is particularly important when the acual computational circuitry operates in a fixed point arithmetic mode. See, for example, the Gilmartin et al patent, supra.

Most sequential FFT organizations suffer, however, from the requirement that a relatively large memory be provided for a given input sequence length.

SUMMARY OF THE INVENTION

In summary, the present invention provides for an improvement to the organization suggested by the Singleton reference supra. Specifically, a sequential fast Fourier transform processor is implemented which minimizes the amount of serial data storage required. A single complex arithmetic unit accepts a data sequence comprising $N=2^m$ input signals in serial format and performs the basic fast Fourier transform operations. In accordance with the present invention, a unique data formatting and routing procedure is shown to require only first and second serial memories having $2^{m-1}-1$ and $2^m-1$ memory elements, respectively. A simple logic circuit configuration provides for the distribution and recombination of data to and from the arithmetic unit. In accordance with an alternate embodiment of the present invention, a plurality of stages in accordance with the basic design are incorporated in a cascaded arrangement to enhance processing speed.

An increase in operating speed is also achieved by modifying the input and inter-stage data formatting to permit the required complex computations to be performed in one-half of the time required by processors of the type described in U.S. Pat. No. 3,544,775, for example. In particular, by separating the real and imaginary components appearing at the input to a processing stage, and providing additional multipliers and adders, the component multiplications required in forming FFT terms may be performed in parallel.

BRIEF DESCRIPTION OF THE DRAWINGS

A more complete understanding of the present invention may be had from a consideration of the detailed description presented below in connection with the attached drawing wherein.

DETAILED DESCRIPTION

Figure 1:
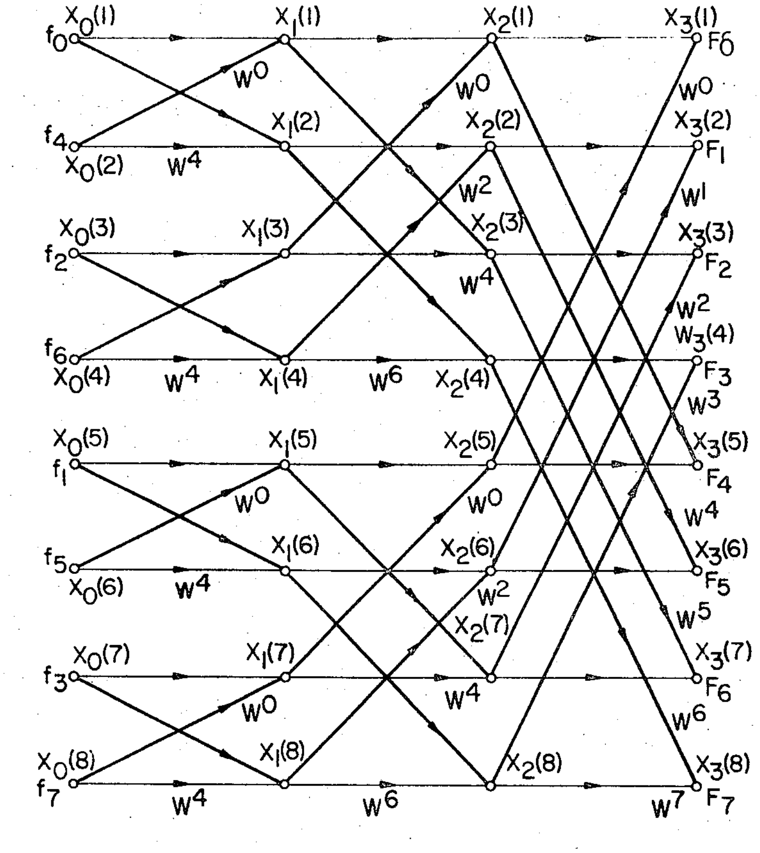
FIG. 1 PRIOR ART
FIG. 1 is a data flow diagram for the well-known (prior art) prescrambled Cooley-Tukey algorithm for an eight-sample input sequence.
Figure 2:
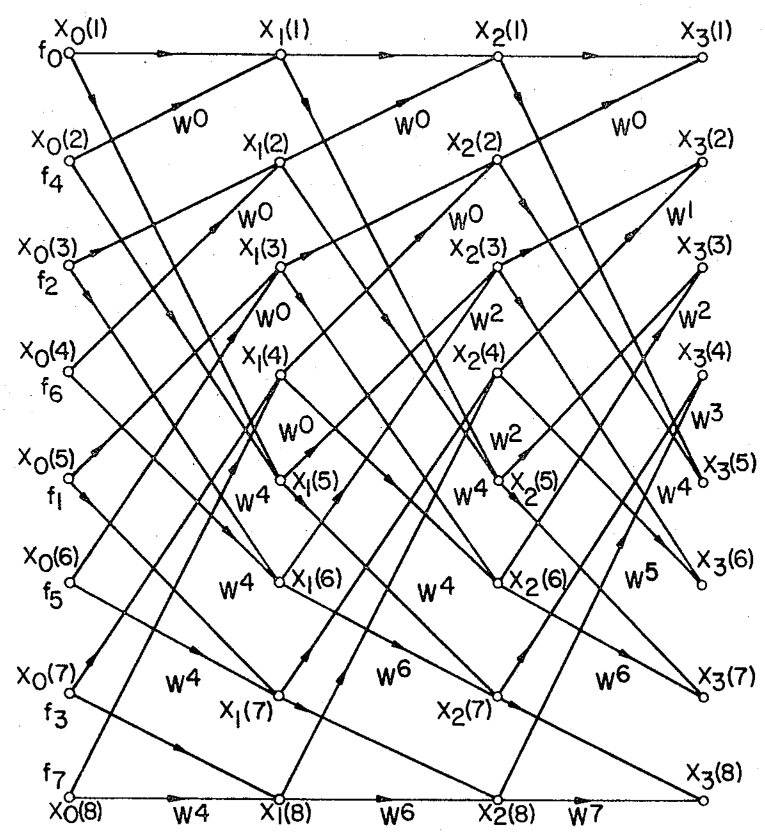
FIG. 2 is a data flow diagram for a modified FFT algorithm based on the teachings of the Singleton reference, supra.

For purposes of simplifying the detailed explanation of the present invention, a brief review will be presented of the well-known Cooley-Tukey FFT algorithm. Thus, there is shown in FIG. 1 a data flow diagram illustrating the prescrambled Cooley-Tukey algorithm for an eight-point transform. The prescrambling refers, of course, to the performance of a reformating of data in accordance with the well-known digits-reversed technique described, for example, in the Gentleman and Sande paper, supra, and in copending U.S. Pat. application Ser. No. 82,572 by P. S. Fuss filed Oct. 21, 1970. For comparison, FIG. 2 shows a corresponding eight-point transform data flow in accordance with the techniques described generally in the Singleton reference, supra. Both of these algorithms compute $$F_k = \sum_{n=0}^{N-1} f_n w^{nk}, \quad (1)$$

where $$W^k = e^j\ (2\pi k/N) \quad (2)$$

with $N$ = number of sample points in an input sequence or record and $k = 0, 1, ..., (N-1)$.

Figure 3:
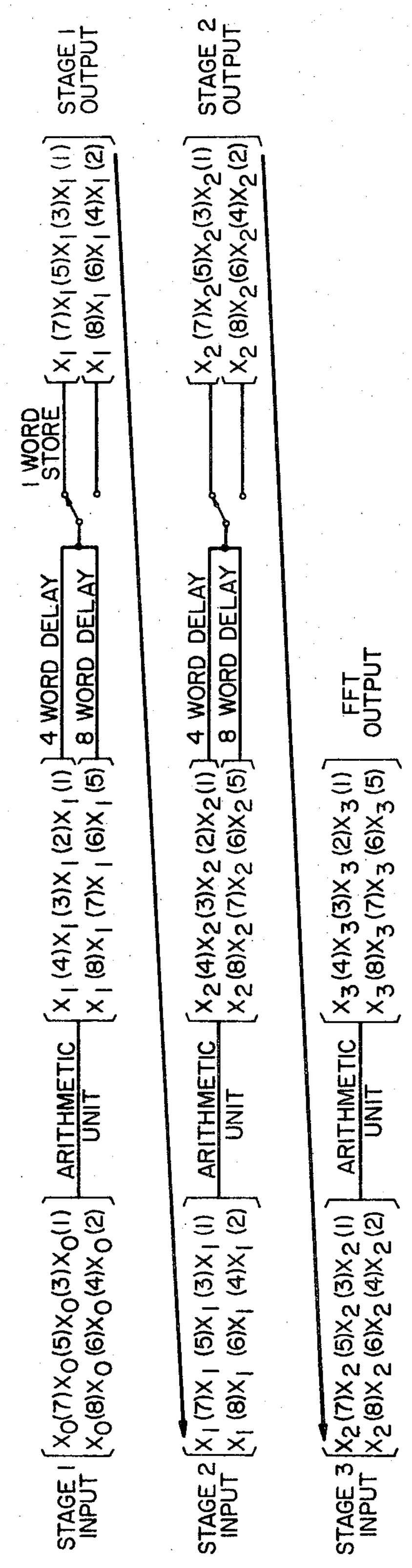
FIG. 3 shows the actual input and output sequences appearing at each iteration for the eight-input sample process illustrated in FIG. 2.

FIG. 3 is a diagramatic representation of the entire N-element sequences generated at the output of each of the $m = \log_2 N = 3$ phases of processing in accordance with the algorithm represented in FIG. 2. Thus, (ignoring ordering of values for present) an input sequence $X_0(1)$, $X_0(2)$,..., $X_0(8)$ is presented on two input paths and is transformed to a first sequence $X_1(1)$,..., $X_1(8)$ of intermediate results, the elements of which are selectively delayed and distributed to form the output sequence for the first phase of processing. This basic sequence of operations is then repeated in the second and (except for reordering) the third phase.

Figure 4:
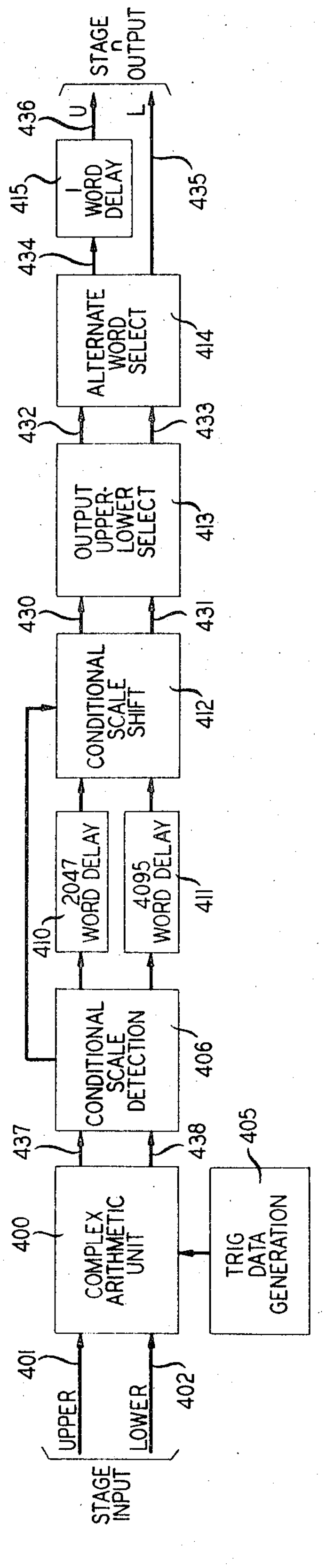
FIG. 4 is a block diagram of one stage of an FFT processor in accordance with the instant invention.

FIG. 4 shows a block diagram representation of one stage of an implementation of one version of the FFT processor and associated algorithm in accordance with the instant invention. It will be assumed for purposes of the present discussion that the input data sequence includes 4,096 words of pre-scrambled data. The prescrambling of the original input sequence may be accomplished by any one of several standard scrambling techniques. In particular, that described in copending U. S. Pat. application Ser. No. 82,572 by P. S. Fuss filed Oct. 21, 1970 is typical. Other scrambling methods and apparatus are described in a patent application by F. W. Thies, entitled "Method and Apparatus for Reordering Data" Ser. No. 211,882 filed Dec. 27, 1971 and assigned to the assignee of the instant application.

FIG. 4 shows the stage of the FFT processor to have a complex arithmetic unit 400 which operates on two input data streams arriving on leads 401 (upper) and 402 (lower). The trigonometric function values required by complex arithmetic unit 400 to effect the FFT computations are supplied by trigonometric data generation circuit 405. Again, for the sake of definiteness and in keeping with the general data formats used, for example, in the above-identified copending U. S. Pat. application, Ser. No. 82,572, it will be assumed initially that the input data are presented as alternate real and imaginary components in serial format at the rate of one complex word per microsecond. To permit real time operation then, it is required that complex arithmetic unit 400 process these data at the rate of 1 microsecond per sample. More will be said below about the details of arithmetic unit 400.

It provides convenient to provide at the output of arithmetic unit 400 a rescaling circuit for adjusting the magnitude of resulting output data words. Thus a conditional scale detection circuit 406 is used to determine whether an output data word from arithmetic unit 400 exceeds a permissible value imposed by word lengths, desired significance and the like. When a positive indication of excessive magnitude is generated, associated conditional scale divide circuit 412 becomes operative. Basically, this circuit divides (shifts) data words to maintain desired significance within the constraints of maximum word length.

In one simple embodiment, scale detection circuit 406 may comprise circuitry for detecting the digit position of the most significant 1 in the real and imaginary components of each result generated by the arithmetic unit 400. Alternately, detection circuit 406 may simply be an overflow indicator in the arithmetic unit itself.

There scaling techniques may be used to prevent overflow of a full word in arithmetic unit 400 by detecting an incipient overflow (an "overflow" of a less than maximum word length). By permitting maximum significance at each point, however, the signal-to-noise ratio associated with rounding and truncation may be maximized.

Individual delays of 2,047 and 4,095 input time intervals (2,047 and 4,095 microseconds in the instant example) are introduced in the upper and lower output paths from arithmetic unit 400. These delays are indicated in FIG. 4 by blocks 410 and 411, respectively. Although shown interposed between blocks 406 and 412, these delay units can as well follow the divide circuit 412. When the "poor man's floating point" technique (also called the "block floating vector" technique) described, for example, in U.S. Pat. No. 3,571,803, issued to Huttenhoff and Shively on Mar. 23, 1971 is used, the complete set of results for an entire stage are desirably at hand before rescaling is accomplished. Accordingly, the rescaling circuit 412 would ordinarily follow the delay circuits 410 and 411.

Selection circuitry 413 is then provided at the output of the scaling circuit as indicated in FIG. 4. In general, select circuit 413 alternates between selecting 2048 complex words from lead 430 and an equal number of complex words from lead 431. The need for this type of alternation follows from the fact that the delay unit 410 stores the first half of the desired output results and delay unit 411 stores the second half. See the sequence in FIG. 3. The actual selection is performed by select circuit 413 using standard logic gating under the control of a periodic clock signal.

Finally, to effect the desired pairing of words at the output of each stage, alternate word select circuit 414 alternately selects one word from lead 432 and delivers it to lead 434. Such words are then delayed by one sample interval (1 microsecond in the example above) for subsequent presentation on lead 436. Similarly, alternate words presented on lead 433 are switched to lead 434 and are delayed before appearing on lead 436. The other alternate words appearing on lead 433 are presented directly on lead 435. Leads 435 and 436 are then the lower and upper output leads, respectively, for a stage of the FFT processor, in accordance with the instant invention.

From the signal flowcharts in FIGS. 2 and 3 and from a general understanding of FFT techniques, it is clear that the operations performed by a circuit of the form shown in FIG. 4 are required to be iterated until the output appearing on leads 437 and 438 are the desired Fourier series coefficients. This result may be achieved in a variety of ways. In particular, for an $m = log_2 N$ stage process $m$ substantially identical stages of the form shown in FIG. 4 may be cascaded. Note, however, that the reordering (selection) circuitry need not be provided at the $m^{th}$ stage.

Alternately, a single stage of the type shown in FIG. 4 may be used and the output from the stage connected to the input to the stage. Upon recirculating the results in this manner for a total of $m$ iterations, the same result obtains. It is clear that other variations including the use of more than 1 but less than $m$ stages may be used to speed processing while reducing the required hardward to some degree. In general, if M stages are used, a speed-up over the single stage (recirculated) configuration of M will be realized. When a plurality of cascaded stages of the type shown in FIG. 4 are used, they may all be identical. It should be noted, however, that the circuit of FIG. 4 does not provide 100 percent efficient use of delay units such as 410 and 411 for the case where butted input records are supplied. That is, since delay unit 411 receives the second half of each set of arithmetic unit results, it will (after correctly delaying the results from the first record) provide samples to the upper/lower select circuit at the same time as delay unit 410. Thus a waiting period or inter-record gap (of one record interval) must be supplied. Thus, for a given hardware operating speed the through-put is reduced by one-half. Means will be discussed below whereby this apparent limitation may be effectively compensated for while maintaining the desired uniformity between stages.

It should be noted that a delay equal to one record period inserted in both the upper and lower paths will permit the above-mentioned recirculation of results to proceed without causing an "overlap" of results to occur at any point. These delay units may be inserted at any convenient point in the upper and lower data paths in FIG. 4 or they may be included in the "feedback" paths connecting the leads 436 and 435 to 401 and 402, respectively. Alternately a single $2^{m-1}$ unit delay may be introduced into the combined output from delay units 410 and 411. Thus such an additional delay unit (a four-unit delay for the arrangement of FIG. 2) will be alternately supplied with four values from delay units 410 and 411.

From an analysis of the arrangement of FIG. 4, it can be shown that a basic limitation which prevents the realization of real time operation under high speed input constraints is the fact that the data are presented in a serial manner with alternate real and imaginary values appearing on each of the two input data paths 401 and 402. The consequence of this data formatting is that, within the constraints of the input rate considered above, the real part of an input sample value must be stored for ½ microsecond.

Figure 5B:
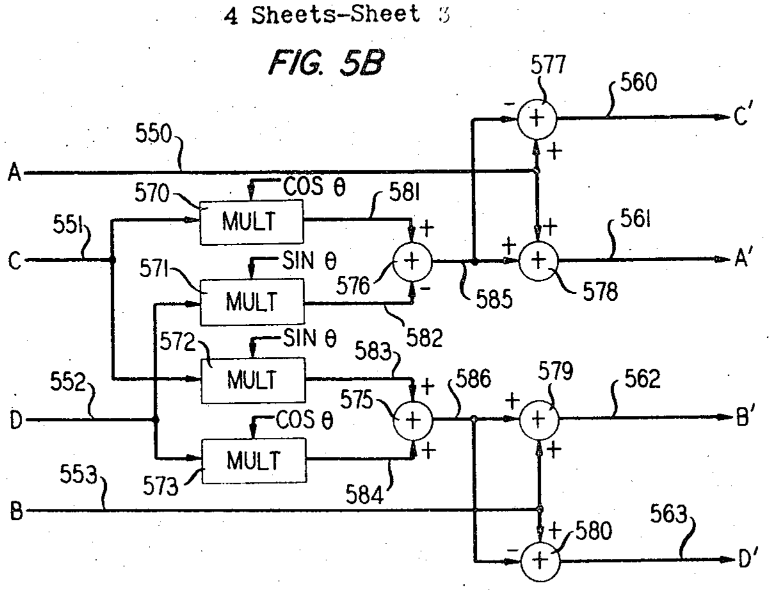
FIG. 5B shows an improved FFT arithmetic unit in accordance with the instant invention.
Figure 5A:
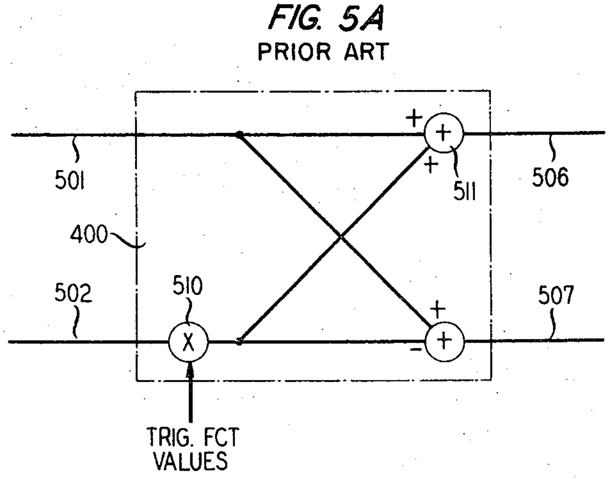
FIG. 5A PRIOR ART
FIG. 5A shows a prior art arithmetic unit for an FFT processor.

FIG. 5A shows a standard configuration for an arithmetic unit for performing the complex computations required by the processing indicated in FIGS. 2 and 3. In particular, FIG. 5A shows in greater detail the configuration for complex arithmetic unit 400 shown in FIG. 4. The circuit of FIG. 5A includes two input leads 501 and 502. The paired input values (as reformatted or scrambled) are presented on leads 501 and 502 in sequence Thus referring to FIG. 3 it is seen that $X_0(1)$ and $X_0(2)$ are presented simultaneously on respective leads 501 and 502. The outputs from the circuit of FIG. 5A appear on leads 506 and 507. The first pair of outputs appearing on respective leads 506 and 507 are $X_1(1)$ and $X_1(5)$. Subsequent input pairs ($X_0(3)$ and $X_0(4)$, $X_0(5)$ and $X_0(6)$, and $X_0(7)$ and $X_0(8)$) yield corresponding output pairs as indicated in FIG. 3.

The generation of the required output pairs in response to a particular applied input pair is performed in the circuit of FIG. 5A by having the signal appearing on lead 502 multiplied at multiplier 510 by the appropriate trigonometric function value indicated along the corresponding arrow in FIG. 2. This product is then added to the input appearing on lead 501, the addition being performed by adder 511. Similarly, this product is substracted by the subtraction circuit from the input appearing on lead 501 to generate the output on lead 507.

It is at once apparent, having recognized the nature of the limitation of the circuit of FIG. 4 based on the use of the arithmetic unit shown in FIG. 5A, that reformatting of the input data and performing parallel operations on these reformatted data will permit a desired increase in efficiency. Thus, if the input data are reformatted so that the real and imaginary parts of the data are entered in parallel and provision is made to perfrom both the sine and cosine constituent multiplications at the same time, then a two-fold increase in processing speed may be realized.

FIG. 5B shows a modification to the standard FFT complex arithmetic unit which gives rise to the desired increase in efficiency last mentioned, the circuit in FIG. 5B then is arranged to receive data on each of four leads 550–553. Data arriving on leads 550 and 552 are the real components of an input data sample. Similarly, leads 551 and 553 receive corresponding imaginary components of input samples. Because of the well-known relationship $e^{i\theta} = \cos\theta + i \sin\theta$, the required complex multiplications using complex exponential multipliers are conveniently effected by performing constituent cosine and sine multiplications.

To more fully understand the operation of the circuit of FIG. 5B, it would be well to consider the mathematical operations required to generate the desired output signals on output leads 560–563. To be explicit, it will be considered that the two complex values entered at the left of the arithmetic unit of FIG. 5B are $X_j$ and $X_k$. Thus, $$X_j = (A + i B)$$

$$X_k = (C + i D).$$

The required operations to be performed with respect to input values $X_j$ and $X_k$ are, then, to generate output values A' and B', and C' and D' where $$A' + iB' = X_j + X_k e^{i\theta} = (A + iB) + (C + i D) (\cos\theta + i \sin\theta)$$

$$C' + iD' = X_j - X_k e^{i\theta}$$

Because of the similarity of the operations performed in generating both A' and B' on the one hand, and C' and D' on the other hand, only the details of the computation of A' and B' will be treated explicitly, Thus by expanding the multiplications and additions indicated above, it is seen that $$A' + iB' = (A + iB) + (C \cos\theta - D \sin\theta)$$
$$+ i(D \cos\theta + C \sin\theta)$$
$$= (A + C \cos\theta - D \sin\theta)$$
$$+ i(B + D \cos\theta + C \sin\theta).$$

In the analysis above, the trigonometric function value $\theta$, while not explicity evaluated, i.e., specified for a particular iteration, is understood to be a typical value encountered in the sourse of computation. In any event, only one value for $\theta$ is presented at each of the operations indicated in the formation of A' and $i$ B'. It is recognized, of course, that both sine and cosine values associated with the variable $\theta$ are supplied at each multiplication or addition.

Returning, then to the arithmetic unit of FIG. 5B, it is seen that input A appears on lead 550 and input B (the complex $i$ being understood) appears on lead 553. The corresponding C and D components associated with the input value $X_k$ appear on leads 551 and 552 as shown. From the analysis above it is clear that only the signals appearing on leads 551 and 552 are required to be multiplied by corresponding trigonometric function values. These multiplications are performed by the multipliers 570–573 shown explicitly in FIG. 5B. The output appearing on lead 581, then, is the product signal C cos $\theta$. Similarly, the output on leads 582 is D sin $\theta$. Corresponding outputs on leads 583 and 584, then, are D sin $\theta$ and C cos $\theta$. Adder 576 is then operative to generate at its output on lead 585 the algebraic sum C cos $\theta$ − D sin $\theta$. Similarly, adder 575 generates at its output the algebraic sum C sin $\theta$ + D cos $\theta$. Finally adders 578 and 579 become operative to form the further algebraic sums A + C cos $\theta$ − D sin $\theta$ and B + C sin $\theta$ + D cos $\theta$. These latter two sums appear on leads 561 and 562, as shown in FIG. 5B. It is also clear that these two components are precisely the A' and B' factors required as results of processing. The formation of the remaining components C' and D' are generated in an obvious manner in light of the above description and the details of FIG. 5B.

The impact of the facter arithmetic unit on the data storage requirements suggests the use of parallel memory. However, in accordance with the present invention, no additional memory (delay) is required. That is, for the 4096 point algorithm, the 2047 complex word delay becomes two 2047 real word delays. Since one complex word includes two real words (or one real and one "imaginary" word), the total delay (memory) remains the same.

Figure 6:
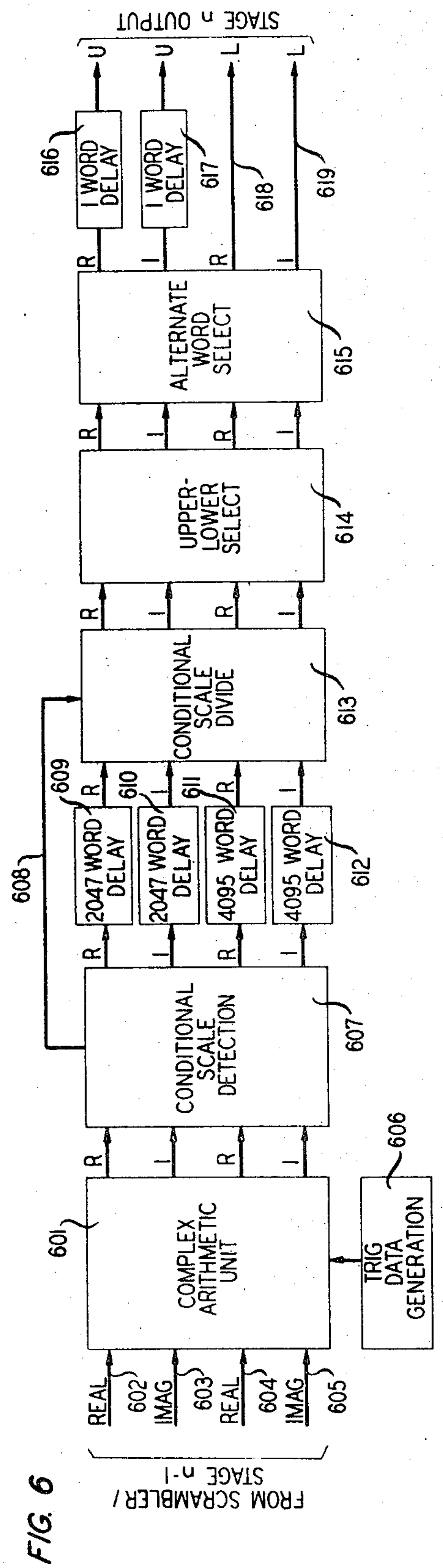
FIG. 6 illustrates a modification to the system of FIG. 4 based on the use of an arithmetic unit of the type shown in FIG. 5B.

FIG. 6 illustrates a single stage of an FFT processor using the improved arithmetic unit. The apparatus required to implement the improved single stage of the processor comprises two additional multipliers, four additional adders, and incidental gating circuitry. This additional circuitry is that required in converting from an arithmetic unit of the type shown in FIG. 5A to that shown in FIG. 5B. It is worth noting at this time that though the number of individual components may be increased slightly, their form is in on way modified. That is, precisely the type of multipliers and adders used in the circuit of FIG. 5A may be used in the corresponding circuit elements of FIG. 5B. In each case, as indicated previously, components of the type cited in the above-cited Bergland and Klahn patent, U. S. Pat. No. 3,544,775, as well as those described elsewhere in the literature are utilized. An increase in speed is desirably incorporated in the exact circuitry used to effect the indicated multiplications and additions of the circuit of FIG. 5B. Thus, assuming a sample period of 1 microsecond it is advantageous to adjust the control signals (i.e., the clock signals) to permit the adders and multipliers to operate in such manner as to generate outputs on leads 560 through 563 at intervals of ½ microsecond. It should be understood that such operations are well within the technology at its present state. That is, no new circuitry need be designed to achieve these increased speeds. Typical circuit modules used in effecting these multiplications and additions are gates, flip-flops and adders available as emitter-coupled logic elements manufactured by many leading manufacturers.

Returning then to FIG. 6, we see a single stage of a processor of the same general format shown in FIG. 4. However, arithmetic unit 601 assumes the form shown in FIG. 5B. The real and imaginary components of the upper and lower input samples are shown appearing on leads 602 through 605. The terminology "samples" should be understood to include actual input samples received from the data scrambler and the outputs from a previous stage. Corresponding scale detection and scale dividing circuits 607 and 613 are shown in FIG. 6. These, of course, correspond to the circuits 406 and 412 shown in FIG. 4. Again, the delay units required for the outputs of complex arithmetic unit 601 are shown intermediate the scale detection and scale divide circuits. This arrangement is for convenience only and again it should be recognized that the respective delay units may follow the scale divide circuit 613 when convenient. Again recall that the "poor man's floating point" techniques do not permit this option ordinarily. Because of the data formatting introduced in raising the efficiency of the complex arithmetic unit 601, there are shown four separate delay lines. Thus delay lines 609 and 610 each provide 2047 real delay units. The unit of delay is equal to the duration of the real (or imaginary) part of an input sample. That is, each of the "words" of delay is comparable to one-half of a word in the system of FIG. 4, which delays complex words. In the system of FIG. 6, delay units 609 and 610 provide storage for 2047 real and imaginary components, respectively, and units 611 and 612 storage for 4095 real and imaginary components, respectively.

The upper and lower selection circuitry in FIG. 6 again operates as an upper and lower selection switch for equal alternate intervals. However, because of the bifurcation of the data words into respective real and imaginary components, the switch is effectively a double pole switch connecting alternate (upper and lower) pairs of leads to a single pair of selection circuit output leads for equal durations of 1023 sample periods. Similarly, these selection circuit output leads are alternately connected to pairs of stage output leads. The upper pair of output leads introduces a one word delay for signals presented thereon in a manner analogous to the (single) upper stage output lead in FIG. 4.

The angles θ for which values of cos θ and sin θ need be supplied at each stage are shown in Table I.

TABLE I

| Stage Number | Sample Range Lower | | Upper | Angle |
|---|---|---|---|---|
| 1 | 1 | – | 4096 | 0 |
| 2 | 1 | – | 2048 | 0 |
| | 2049 | – | 4096 | 90 |
| 3 | 1 | – | 1024 | 0 |
| | 1025 | – | 2048 | 45 |
| | 2049 | – | 3072 | 90 |
| | 3073 | – | 4096 | 135 |
| . | . | | | . |
| . | . | | | . |
| . | . | | | . |
| 12 | 1 | – | 1 | 0 |
| | 2 | – | 2 | 90/1024 |
| | 3 | – | 3 | (2×90)/1024 |
| | 4 | – | 4 | (3×90)/1024 |
| | . | | | . |
| | . | | | . |
| | 4095 | – | 4095 | 180 – (2×90)/1024 |
| | 4096 | – | 4096 | 180 – 90/1024 |

It can be seen that by providing an increase in arithmetic unit operating speed by a factor of two, the required inter-record gap mentioned above has been compensated for. Thus a satisfactory through-put for butted records may be achieved while maintaining substantial identity between stages. Where butted records are supplied, a one-record buffer is conveniently supplied at the input to the circuit of FIG. 6.

It is well recognized in the FFT processing arts that the original input samples are not originally subjected to a complex multiplication in the usual sense. That is, through the first and second iterations the multiplications by complex exponentials indicated by the general pattern shown in FIG. 2 and described extensively in the literature amounts only to multiplying by 1 or 0. Accordingly, it is possible in many cases to provide for a degenerate first and second processing stage. For present purposes, it may be considered that when a plurality of stages of the general form shown in FIG. 6 are provided in calculating Fourier coefficients, that the first two stages may advantageously assume a simpler form. Thus in accordance with an alternate embodiment of the present invention the generalized stage shown in FIG. 6 may be replaced by a simple structure for performing the first and second iterations. In particular, the circuitry of FIG. 7 may be employed for this purpose.

Figure 7:
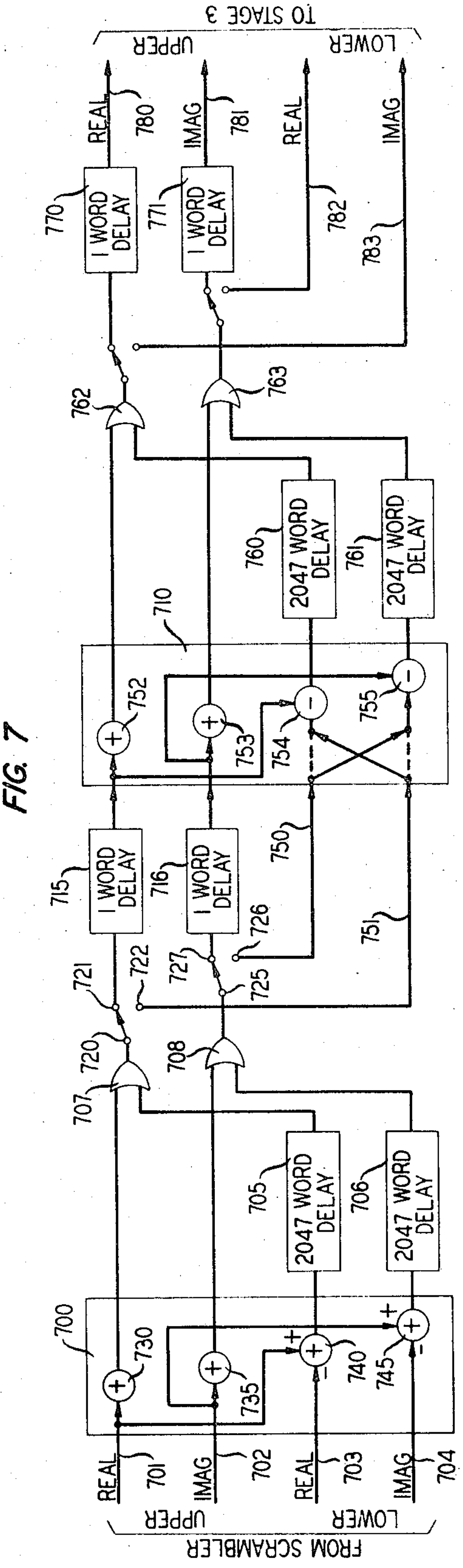
FIG. 7 illustrates modifications to the apparatus of FIG. 6 which may be introduced to simplify processing at the first and second iterations of an FFT process in accordance with the instant invention.

As may be seen by examining FIG. 7 in detail, arithmetic units 700 and 710 do not include multipliers. The general coonfiguration of these stages is, however, substantially based on that provided by the arrangement in FIG. 6. In particular, it is seen that the arithmetic unit 700, for example, receives separate real and imaginary component signals for both an upper and a lower input. In the circuit shown in FIG. 7, the input to arithmetic unit 700 necessarily derives from a source of scrambled input samples. That is, there is no previous stage to which it need be connected. The arithmetic operations performed by arithmetic unit 700 are obvious from the figure and from a consideration of the more general complex arithmetic operations described in detail above.

For simplicity, no scaling of output results from arithmetic unit 700 is provided, although such scaling could be included if deemed appropriate. Instead, the outputs from units 700 are merely delayed in the manner shown. These delays are provided by the 2047 time unit delays 705 and 706. The alternate word select function is provided by switch 720 based on inputs to OR-gate 707 and by switch 725 based on inputs to OR-gate 708. Finally, the one-word delays necessary to have the inputs provided to the next stage in the manner of FIG. 6 are provided by one-word delays 715 and 716.

The similarity of the second (degenerate) stage in FIG. 7, beginning with the inputs to arithmetic unit 710, should now be obvious. While the details of the arithmetic operations are slightly different for stage 2, there still are required no explicit multiplications (other than by 1 or 0). Again, the 2047 word delays are provided by delay units 760 and 761. After introducing the selection of alternate sequences as inputs to OR-circuits 762 and 763, the individual components of each of the upper and lower output words are provided on leads 780–783. As indicated, these outputs are connected to corresponding inputs for the input of the arithmetic unit for stage 3. Stage 3 and subsequent stages will, of course, assume the standard form shown in FIG. 6.

In addition to providing a simplification of the hardware required to perform each of the first and second iterations of the fast Fourier transform in accordance with the flow diagram of FIG. 2, for example, an increase in operating speed is also achieved. Thus the elimination of the explicit multiplication in many cases permits the use of a single adder, for example, to be time-shared among two or more operations during the period otherwise used for multiplication.

Thus it can be seen from the above detailed description that an improved circuit arrangement for effecting the fast Fourier transform has been developed. A novel implementation of the Singleton-type FFT algorithm having a substantially identical structure for each stage has been described. Further, it is shown how the total overall delay (memory) may be minimized (for non-butted records) and an improvement in computational speed realized using a novel formatting and processing of input and intermediate result values. Finally, an alternate configuration has been presented to simplify the computation of results at the first and second stages where no explicit multiplications are required. The individual circuit components and functional units (adders, multipliers, gates and delay units) are of standard design and may be implemented using a variety of particular circuit elements.

Because of the substantial identity between stages, it is clear that the structures described above lend themselves readily to miniaturized semiconductor fabrication. In particular, it is evident that a large scale integrated circuit (LSI) implementation will prove advantageous for many applications. Thus, the teachings of the present invention permit a high performance FFT processor to be realized using only a minimum of components, each of standard design, in achieving an overall reduction in size relative to prior art arrangements.

While the present disclosure includes explicitly only a "prescrambled" implementation, it is clear that a post-scrambled implementation using the above teachings is immediate. That is, the extensions to the system of copending U.S. Pat. application Ser. No. 82,572, supra, contained in a U.S. Pat. application Ser. No. 212,572 by P. S. Fuss, filed of even date herewith may be adopted for use in similarly extending the specific embodiment described above.

While the above description has proceeded in terms of various assumed sample sizes and input/output rates, no such limitations are fundamental to the instant invention. Thus many variations of the above teachings within the spirit and scope of the instant invention, as defined by the attached claims, will occur to those skilled in the art.

What is claimed is:

1. Apparatus for generating Fourier series coefficients corresponding to N ordered samples of a time varying signal comprising a plurality of cascaded processing stages, each of which comprises input means for accepting sequential pairs of samples, means for selectively multiplying said input samples by predetermined trigonometric function values, means for generating output signals comprising means for adding the products of said multiplications selectively to others of said input values and for subtracting the products of said multiplications selectively from others of said input values, and means for selectively imposing a fixed delay on the resulting output signals, said delay being of equal value at each stage.

2. Apparatus according to claim 1 wherein each of said processing stages further includes means for detecting when the magnitude of said output signals exceeds a predetermined value and means responsive to said determination for rescaling said output signals

3. Apparatus according to claim 2 wherein each of said processing stages further comprises means for selectively delaying one complex component of each output value signal such that the real and imaginary components of each of said output signals is presented substantially simultaneously to said input means for the immediately following stage.

4. Apparatus according to claim 3 wherein said means for multiplying and means for adding and subtracting include means for forming signals representing the function $A'+iB'=A+iB+(C+iD)e^{i\theta}$ and $C'+iD'=A+iB-(C+id)e^{i\theta}$, where $(A+iB)$ and $(C+iD)$ represent a pair of complex input values.

5. Apparatus for generating Fourier series coefficients corresponding to a set of $N = 2^m$ ordered input signals comprising 1. an arithmetic unit having first and second input terminals and first and second output terminals for operating on pairs of signals applied at said input terminals to form corresponding pairs of signals at said output terminals, said pairs of signals appearing at said output terminals corresponding to the sum and difference signals for a selected one of said pair of signals applied at said input terminals with a signal representing the product of the other of said pair of signals applied at said input terminals with a predetermined trigonometric value,
2. first connecting means for applying alternate ones of successive pairs of said set of N input signals to respective ones of said pair of input terminals, and
3. second connecting means for applying pairs of signals formed at said pairs of output terminals to said pair of input terminals, said second connecting means comprising delay means for selectively delaying said pairs of signals appearing at said pair of output terminals in accordance with a fixed time relation prior to their application to said input terminals.

6. Apparatus according to claim 5 wherein said delay means for selectively delaying comprises first and second serial delay units each selectively connected between one of said pair of output terminals and one of said input terminals.

7. Apparatus according to claim 7 wherein said first delay unit comprises means for delaying said signals appearing at said first output terminal by an amount equal to $2^{m-1}$—1 units of delay, and said second delay unit comprises means for delaying said signals appearing at said second output terminal by an amount equal to $2^m$—1 units of delay.

8. Apparatus according to claim 8 wherein said second connecting means further comprises means for alternately selecting between the output of said first and second delay units.

* * * * *